United States Patent
Snider et al.

(10) Patent No.: US 10,063,497 B2
(45) Date of Patent: Aug. 28, 2018

(54) ELECTRONIC REPLY MESSAGE COMPOSITOR AND PRIORITIZATION APPARATUS AND METHOD OF OPERATION

(71) Applicant: Notion AI, Inc., Ann Arbor, MI (US)

(72) Inventors: Lindsay Snider, Ann Arbor, MI (US); Ian Berry, Ann Arbor, MI (US); Guy Suter, Ann Arbor, MI (US)

(73) Assignee: Notion AI, Inc., Ann Arbor, MI (US)

( * ) Notice: Subject to any disclaimer, the term of this patent is extended or adjusted under 35 U.S.C. 154(b) by 180 days.

(21) Appl. No.: 15/180,023

(22) Filed: Jun. 11, 2016

(65) Prior Publication Data

US 2017/0359277 A1    Dec. 14, 2017

(51) Int. Cl.
| | |
|---|---|
| *G06F 15/16* | (2006.01) |
| *H04L 12/58* | (2006.01) |
| *H04L 12/18* | (2006.01) |
| *H04L 29/08* | (2006.01) |

(52) U.S. Cl.
CPC .......... *H04L 51/02* (2013.01); *H04L 12/1813* (2013.01); *H04L 67/141* (2013.01); *H04L 67/22* (2013.01)

(58) Field of Classification Search
CPC .................. H04L 12/1813; H04L 67/141
USPC .................................................. 709/204, 206
See application file for complete search history.

(56) References Cited

U.S. PATENT DOCUMENTS

| | | | |
|---|---|---|---|
| 2007/0100948 A1* | 5/2007 | Adams | H04M 1/72552 709/206 |
| 2009/0319633 A1* | 12/2009 | Adams | H04M 1/72552 709/206 |
| 2013/0227031 A1* | 8/2013 | Wells | H04L 51/28 709/206 |
| 2013/0232204 A1* | 9/2013 | Barney | H04L 51/02 709/206 |
| 2014/0040406 A1* | 2/2014 | Ollila | G06F 3/0237 709/206 |
| 2014/0115078 A1* | 4/2014 | Bhatia | G06F 17/30528 709/206 |

(Continued)

*Primary Examiner* — Karen Tang
(74) *Attorney, Agent, or Firm* — Jeffrey Schox; Padowithz Alce

(57) ABSTRACT

Replies to electronic messages are prepared, customized, and personalized reflecting a relationship a recipient might have with a sender. Each received message is categorized by medium, meta-data, content, and relationship. A message queue is transformed from FIFO order to groups ordered by similar urgency, complexity, or both. A compositor operates on messages which contain requests for action, requests for information, or imperative directives. A sender's relationship with the message recipient influences both the priority and the voice of a proffered reply as well as the medium of transmission. Prefatory and operative components of the received message are transformed into selectable reply message components. Sentiment analysis of received requests and proposed replies ensures role-appropriate professional quality and respectfulness. The apparatus offers choices of appropriate tone and style to recipient for salutations, body, and closing. As respondent composes a reply, the apparatus presents previously stored or transmitted content for reuse.

12 Claims, 7 Drawing Sheets

(56) References Cited

U.S. PATENT DOCUMENTS

| | | | | |
|---|---|---|---|---|
| 2015/0317398 A1* | 11/2015 | Phillips | ................ | H04L 67/306 |
| | | | | 707/734 |
| 2016/0147731 A1* | 5/2016 | Parikh | ................... | G06F 17/276 |
| | | | | 715/261 |
| 2016/0218997 A1* | 7/2016 | Patil | ...................... | G06F 17/276 |
| 2016/0308794 A1* | 10/2016 | Kim | ........................ | H04L 51/02 |
| 2016/0359771 A1* | 12/2016 | Sridhar | ................... | H04L 51/02 |
| 2017/0124064 A1* | 5/2017 | Lu | ......................... | G06F 17/274 |
| 2017/0134332 A1* | 5/2017 | McCaffrey | .............. | H04L 51/28 |
| 2017/0300472 A1* | 10/2017 | Parikh | ................... | G06F 17/276 |
| 2017/0339076 A1* | 11/2017 | Patil | ..................... | G06N 99/005 |

* cited by examiner

ELECTRONIC REPLY MESSAGE COMPOSITOR AND PRIORITIZATION APPARATUS AND METHOD OF OPERATION

CROSS-REFERENCE TO RELATED APPLICATIONS

None

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISK OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The disclosure relates to electronic messaging such as email, text, and social media. More particularly, the methods and systems described herein relate to improvements in responsiveness and quality of replies.

Conventional systems may simply formulate queries to access a database or file system with authorized positions, instructions, and policies. As is known, natural language processing enables incremental training of systems to better find solutions to problem descriptions. For example, Members of the Stanford NLP Group pursue research in a broad variety of topics: Information Extraction and Extraction of structured information from unstructured text. This includes identifying named entities, resolving anaphora, linking them to a global namespace, and identifying relations between the entities. Known applications include Named Entity Recognition (NER) and Information Extraction (IE); Biological Process Extraction; Coreference Resolution; Knowledge Base Population; and Natural Logic. As is known, publications in this field accessible to those skilled in the art include: Automatic Gain Control and Multi-style Training for Robust Small-Footprint Keyword Spotting with Deep Neural Networks by Rohit Prabhavalkar, Raziel Alvarez, Carolina Parada, Preetum Nakkiran, Tara Sainath published in Proceedings of International Conference on Acoustics, Speech and Signal Processing (ICASSP), IEEE (2015), pp. 4704-4708. Other industrial and commercial references for NLP include Microsoft Natural Language Understanding System and Grammar Checker By Steve Richardson, Microsoft Research, One Microsoft Way Redmond, Wash. 98052. Other references and research includes Enhanced Search with Wildcards and Morphological Inflections in the Google Books Ngram Viewer by Jason Mann, David Zhang, Lu Yang, Dipanjan Das, Slav Petrov in Proceedings of the 52th Annual Meeting of the Association for Computational Linguistics (Demonstrations), Association for Computational Linguistics (2014).

What is needed is a more personalized response that reflects the on-going and evolving relationship between sender and recipient. In particular, which requests from whom should be allocated higher attention than other requests. And the response should not be impersonal if there has been a past rapport established.

BRIEF SUMMARY OF INVENTION

The invention assists message recipients to provide better answers in a more-timely manner to requests that deserve relatively higher priority based on immediate content and history.

An apparatus categorizes electronic messages by medium, meta-data, content, and any relationship between sender and recipient.

Messages which contain requests for action, requests for information, or imperative directives trigger the reply system.

A prompt reply is desirable for queries directed to an individual or to an identifiable entity such as a team, family, or staff.

Sender's relationship with the message recipient influences its priority. The voice of a proffered reply is adjusted for the informality of its medium. It is understood that voice in this context means the vocabulary, syntax, tone, mood, and grammar of a message independently of vocalization, sounds, or text.

Past history of replies and their times to transmitted reply determine expectations of style and urgency.

Components of the received message are transformed into selectable reply message components.

A reply may restate the setting to qualify and condition the reply to the specific reiterated question presented to avoid quotation out of context. It may be delivered in non-editable format.

The apparatus tags and groups requests for short, simple answers. Among these, senders who are relatively more important than other senders to the recipient have priority. This group may be scheduled or reorganized under user control.

Relatively less important correspondents who want lengthy explanations and education are queued below simpler decisions, acknowledgement, choices, or dates requested by frequent senders who have previously received prompt replies.

A user interface offers choices of familiar, social, or formal tone to recipient for salutations, body, and closing appropriate to the medium. The relationship derived from stored message history between sender and recipient suggests a style or voice.

When the medium or the relationship is conversational and nearly interactive, the voice of replies can be informal and assume familiarity. The user can choose among alternate salutations and closing by touching selections.

Queries are parsed to format a reply.

Interrogatives of who, when, and where may elicit short format, easily entered replies. How, why, and what may elicit more verbose long format editorial effort. "Send me" may utilize a drag and drop functionality.

Previously transmitted reply messages are stored for reuse by recipient or those in a similar role.

In addition to published Frequently Asked Questions (FAQ) which have an authoritative nature, the apparatus scans personally composed replies that may amplify individual or group topics.

The nature of the communication medium influences the verbosity and formality of a response.

The content of a message and prior history between the sender and recipient influences the urgency of a reply.

Alternative voices and styles are presented to the user for packaging a reply and retained for future reference.

The invention provides a system for responding to electronic messages in various media including: a parsing subsystem to determine a question presented in a message and to categorize the nature of desired response; a priority subsystem to determine urgency of the sender and sender's relative importance to recipient; a reply compositor subsystem to propose style, voice, formality, format of response according to medium and relationship; a grouping and scheduling subsystem to present a recipient with timely proposed replies in like formats; and a user interface apparatus to receive selections of content, style, delay, and transmission medium. Another aspect of the invention provides a presentation of elapsed time spent on replying to messages and each message so far and a metric indicia of messages replied to so far within a time range, or per session.

BRIEF DESCRIPTION OF DRAWINGS

The foregoing and other objects, aspects, features, and advantages of the disclosure will become more apparent and better understood by referring to the following description taken in conjunction with the accompanying drawings, in which.

DETAILED DESCRIPTION OF INVENTION

Figure 1:
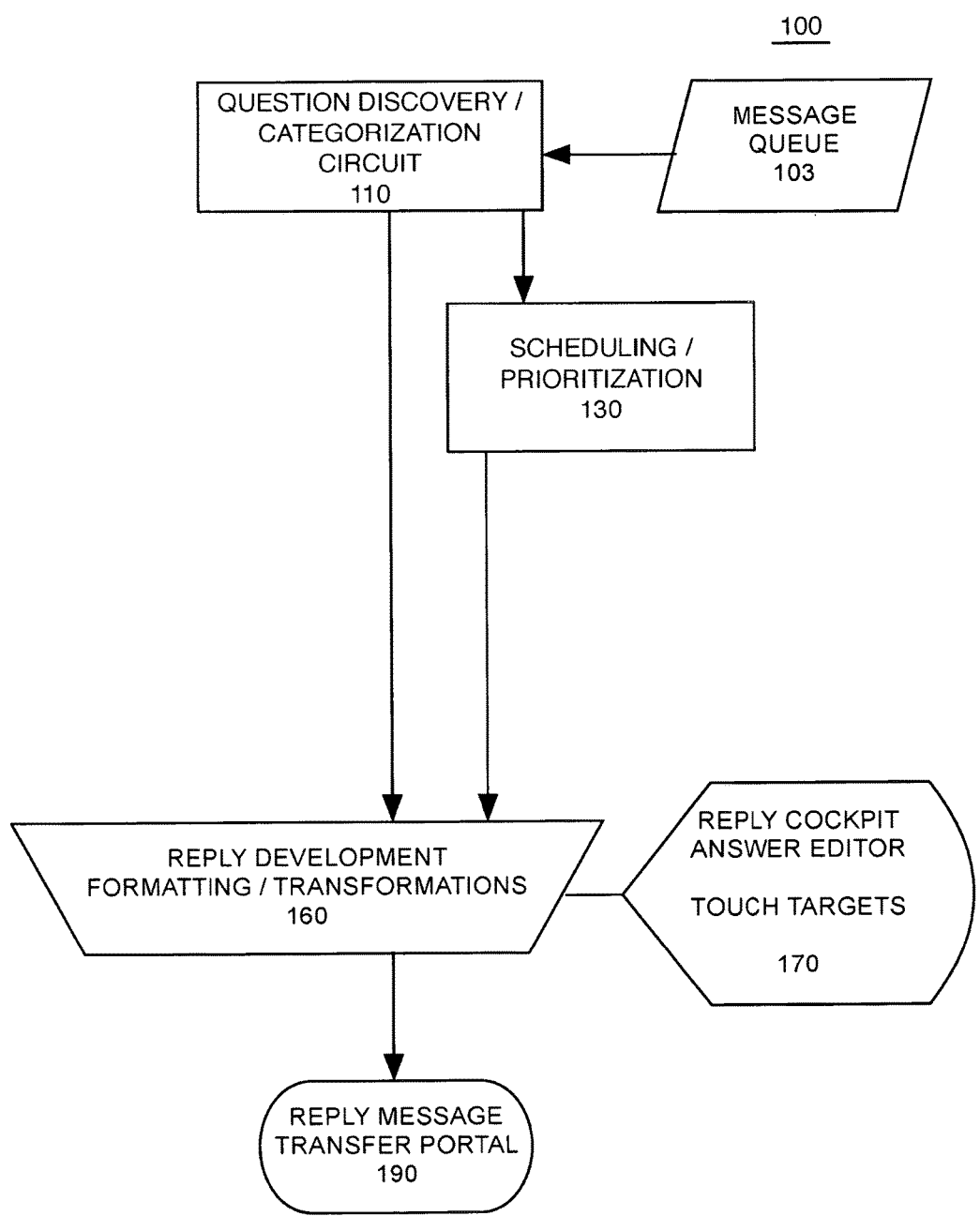
FIGS. 1-5 are block diagrams of systems and circuits of an apparatus embodiment of the invention.

A person has many competing demands for time and attention and must select among many messages which request actions or information to respond to and in what manner.

Any message recipient desires to be responsive to people who rely upon her for answers, actions, and advice.

Additionally, each relationship deserves personal treatment, priority, and consistency.

Both the nature of the relationship and the medium influence the appropriateness of formality and brevity.

Replies to electronic messages that request actions, ask questions, and convey directives are prioritized and composited using an apparatus.

A method detects a query which should receive a reply within an incoming message from a sender. The apparatus supports the recipient in preparing a reply message based on the content and the past relationship with the sender.

A portion of the received message is transformed into the reply. Other sources of content are extracted from stored answers.

Unless the question is exactly matched with a frequently asked question, the recipient adapts the reply as needed.

An apparatus receives messages from a plurality of electronic messaging system and by ranking importance to a recipient of a message sender and by determining a question presented and its urgency schedules a reply and derives content based on the recipient's style, responsiveness, and role with respect to the sender.

Deadlines and sentiment phrases and words affect the priority of sending a reply and the tone or syntax of the content.

Each recipient has control over reflecting or mirroring the style to match his personality, the relationship with the sender, and the nature and sentiment expressed in the sender's query.

Messages from multiple channels are compiled to determine how responsive the recipient has been to the sender.

Reply messages are composited in part from a variety of sources such as a frequently asked question knowledgebase, recipient's previous message history, message histories of recipient's peers in an organization or unit, and the content of the received request, query, or directive.

The response in some cases is composed entirely on a tabla rosa. But in other cases may be a reiteration of a well-founded policy, fact, or opinion.

Once answered, the question and its reply are stored for reuse by the recipient or her peers as needed.

Depending on each recipient's relationship with a sender, the style or tone may be shaped to convey familiarity, formality, warmth, or professionalism.

In an embodiment, some questions are simply asked without having consulted published documentation or familiarity with a product or service user interface. This category of question can be automatically matched with stored content and transmitted without further delay.

To minimize delay and avoid omission, questions can be auto-replied-to based on importance, content of the question, previous user behavior, question deadline.

Other messages merit detailed consideration based on the sender's relationship with the recipient no matter what the content. In this case the relative importance of the sender will cause an earlier response to be prepared. Or a message containing a deadline or calendar vocabulary requires a response before it becomes moot. The apparatus tags and groups simpler questions which allow response selection from a finite set of choices. e.g. yes, no, tomorrow, never. This type of question group balances time consuming research or essay requests.

In an embodiment, each recipient may choose among responses that match her personality or voice for the same factual content. Or vocabulary and vocalization is matched to sender's request by inference or by recipient's intuition. The apparatus offers alternate presentation of replies in familiar, casual, formal, styles, and active or passive voice which the user may indicate preference by simply touching a portion of the display. Sophisticated or simple vocabulary and sentence structure may be chosen on a touch sensitive display.

In some cases a reply may be styled to be sympathetic or encouraging or conciliatory to deal with the tone of a received message. Various selectable phrasings of the same fundamental content helps keeps messaging positive. Semantic and emotional circuits ensure the replies are consistently polite and respectful.

In an embodiment, replies to messages are selected from multiple choices to improve the relationship and reinforce a positive attitude and image.

In some cases, a message simply presents a question which the sender was unable to locate in documentation or a user interface or desires more personal handling. A reply may extract a previously published explanation and convert it to a conversational response.

In an embodiment, an apparatus stores replies to messages containing questions as formally published, i.e. released and approved responses or as ad hoc personal journals for reuse.

In an embodiment, a user can publish content that can be automatically offered as answers to questions posed by other users. In an embodiment, replies which are transmitted by a user to a sender can be automatically offered as answers to questions posed by other users.

In an embodiment, replies which have been transmitted by a user can be reiterated as proposed answers when the recipient receives another question similar to a previously answered question.

In an embodiment, a member of a group coupled to the apparatus initiates a search of the group's knowledge base when composing a question within an instrumented message user interface. The method searches against published content to suggest answers before the question is sent. Membership may be open to the public for some knowledge bases, such as applying for a grant, and private for other knowledge bases such as internal financial accounting procedures.

The invention transforms an incoming message into a template for a reply. In one embodiment an identified question is used as an anchor for placement of a direct reply. Display of non-pertinent verbiage may be suppressed. Thus the result is replies in-line and following each question.

In an embodiment, the method firstly detects questions, requests, and directives in a received message, secondly, transforms the query presented into a non-editable block in a reply, and thirdly interjects an editable form field immediately after each non-editable block, whereby the reply message reiterates the question(s) presented followed by recipient's response.

In some cases, the sender feels a need to disclose more background than necessary. An actual question may be deeply embedded in a long message which requires unraveling.

The invention uses AI and natural language processing to detect questions. Text content is parsed out to allow the recipient to reply to them directly and sequentially.

The method detects and segregates questions which may be buried within or inferred from lengthy received message bodies. By parsing into categories, the recipient may directly answer in the most efficient manner according to the format of the query. Yes/No True/False, multiple choice, calendar date, or numerical values may be selectable rather than free form text entry. The apparatus initiates a keyboard, camera, or speech interface for long format responses. In some cases, the invention transforms an interrogative sentence into an appropriate declarative sentence structure or its negation.

The invention provides consistency amongst team members on answers so that the reply does not depend on which person of a group takes the incoming message.

In an embodiment, team members having an outward facing role for an organization draw on each other's store of experience by reuse of replies to questions previously asked and answered. A method parses questions in received messages and offers a selection of possible answers drawn from the team transmitted message store for adoption or improvement by a recipient. Upon transmittal the improved message is stored for later reuse by current or future members of the team.

The invention determines when templates answers based on history are appropriate for the recipient and the request.

Some simple looking questions actually require complex recitations of tradeoffs and exceptions. When a message can be identified as requiring a compound or conditional reply, stored explanatory content is evoked for completeness in a suggested response.

Proposed replies are tagged by similarity of format and by similarity of voice and style and selectable in lieu of typing.

For example, tagging enables a user to process replies requiring dates or deadlines in a group; replies needing true/false, yes/no, agree/disagree, confirm/deny in a second group; replies that need free form text for explanations are a third group. These groups may be moved around the work day for convenience or control.

Replies can be grouped by the relationships to sender, clients, bosses, buddies, or family.

Replies can be grouped by the casual or degree of formality appropriate to the relationship.

Past and current messages are transformed into a reply according to the sender-recipient relationship, user selection among alternatives, and a question, request, or directive discovered within the received message.

Upon question discovery, the form of the reply is determined. A calendar date and time for a deadline, a proper name for a person or place, a selection among multiple choices. Depending on the past relationship with the sender warm informal language or more respectful proper syntax is offered and selected among. If the relationship is familiar, the greetings, closing, and content may be appropriately casual. If the relationship is business or government, a polite and precise sentence structure is suitable.

The apparatus parses queries to determine the necessary format and verbosity of reply message.

Referring now to FIG. 1, a system 100 includes a circuit 110 that accesses a message queue 103 to perform question discovery and categorization of incoming messages. The question discovery circuit 110 identifies the question being prepared. When the reply development circuit 160 determines that a previously transferred reply addresses the query, it delivers the answer into the message entry user interface. The reply development circuit may transform the query into a declaration, especially if it is a simple binary or one word answer. Links to other files in the system such as documentation may be annotated to the question in the message entry user interface.

Messages are categorized when containing Directives, Requests, Action requests, Information requests, Decision requests or other questions. Messages are parsed for calendar words, time words, dates, or deadlines. Messages are parsed for short interrogative words and phrases like Who, Where, Which, How many, How long. Messages are parsed for long interrogative words and phrases like Why, How, What, and Tell/show me.

Indicia resulting from categorization is provided to a coupled scheduling/prioritization circuit 130.

Message replies are tagged by type and by schedule. Replies are grouped for consideration prior to deadlines or prior to calendar events. Message groups are organized by the number of choices available which can be a sort criteria e.g. OK, No, Now, Sunday, to those having a larger finite range of choices. A user selectively transforms a traditional first in first out (FIFO) queue into a progression from Short Form names or quantities to Long Form essays and explanations or in reverse.

A reply development circuit 160 is coupled to the scheduling/prioritization circuit 130 and also coupled to the question discovery circuit 110 to perform reply formatting and transformation. The reply development circuit trims a message to its essential question and inserts fields for user answers or drag and drop or touch targets to select alternative answers. Team answer history is offered to the user as a reply is under development.

The reply development circuit may transform an interrogative into one or more selectable declaratives. A reply development circuit may transform a message into a questionnaire with editable and non-editable areas or fields. A reply development circuit may interpose areas for answers in-line between discovered questions which a user may tab between. A reply development circuit causes a user interface apparatus to present speech synthesis, speech recognition, gesture and biometric sensing from optics and accelerometers, radio buttons, touch pads, binary toggles, finite lists, or hierarchical navigation panes.

Coupled to the reply development circuit 160 is a user interface apparatus 170 for control over the reply process. As the reply is being developed, a parsing circuit searches for and presents related team history in the subject area if found.

The display of the user interface presents a randomly accessible list of message directives and requests in proposed priority order. For requests enumerating a finite set of choices, the user interface presents a touch pad, radio button, menu, swipe receptor, or graphic. For requests requiring complex response, the user interface presents a keyboard, speech recognition, or a navigation system.

Upon completion of the reply development process, the reply message is provided to a reply message transfer portal 190.

Replies may be transmitted by email servers, text, social media, or audio-visual channels. Some replies such as addresses, contact information, hours of operation, can be auto-transmitted without user intervention when always correct.

Figure 2:
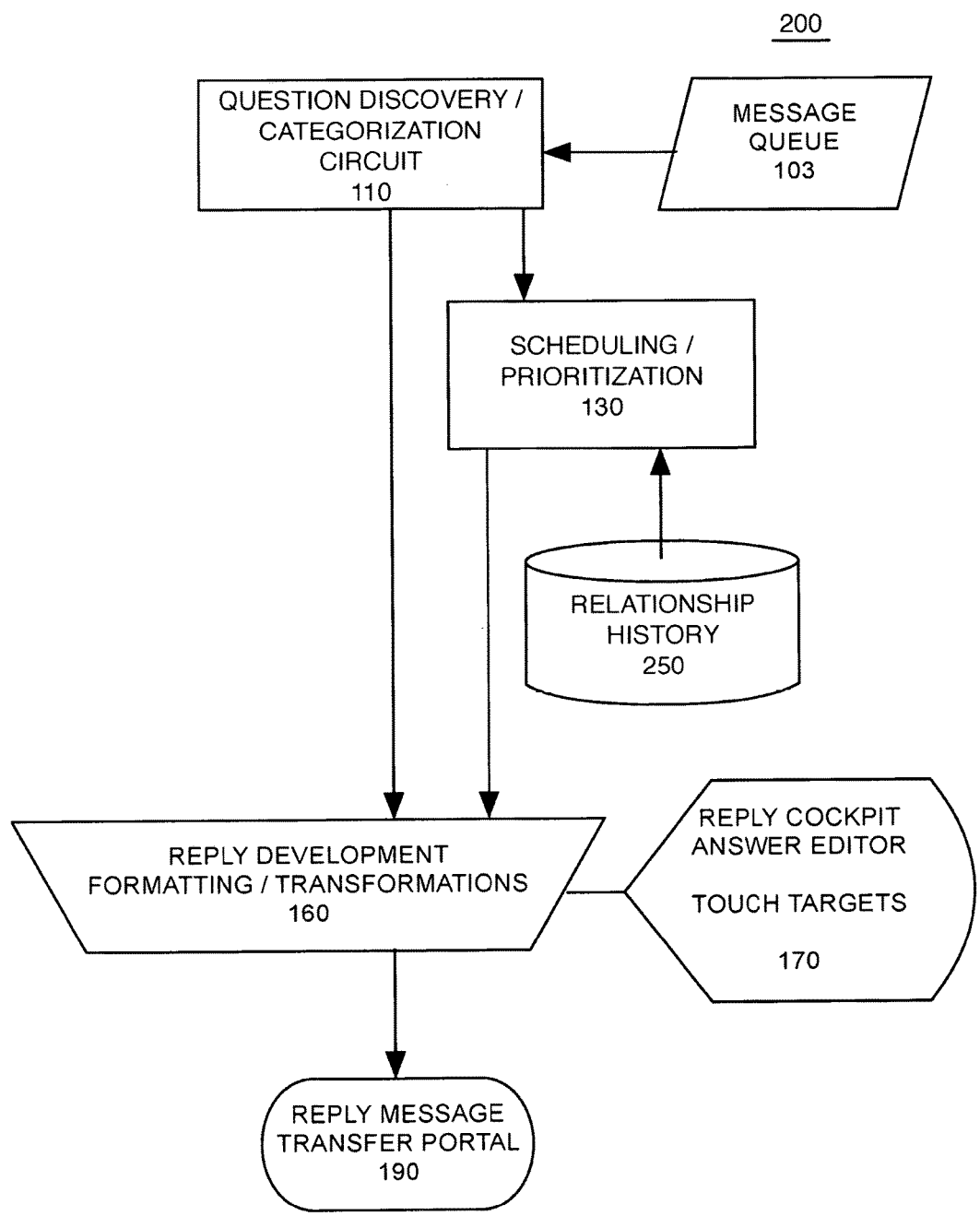

Referring now to FIG. 2, a system 200 also includes a store 250 of relationship history accessible to the prioritization circuit 130. This influences the relative priority of preparing replies to some message senders over replies to other message senders.

When a relationship history indicates formality or informality, the reply can be chosen from a suitable selection of style and vocabulary. A relationship history may cause the recipient to be interrupted with this question from a most important sender even if the content is less urgent. A relationship history may also lower the priority of replying to a high maintenance unnecessarily alarmed sender.

Figure 3:
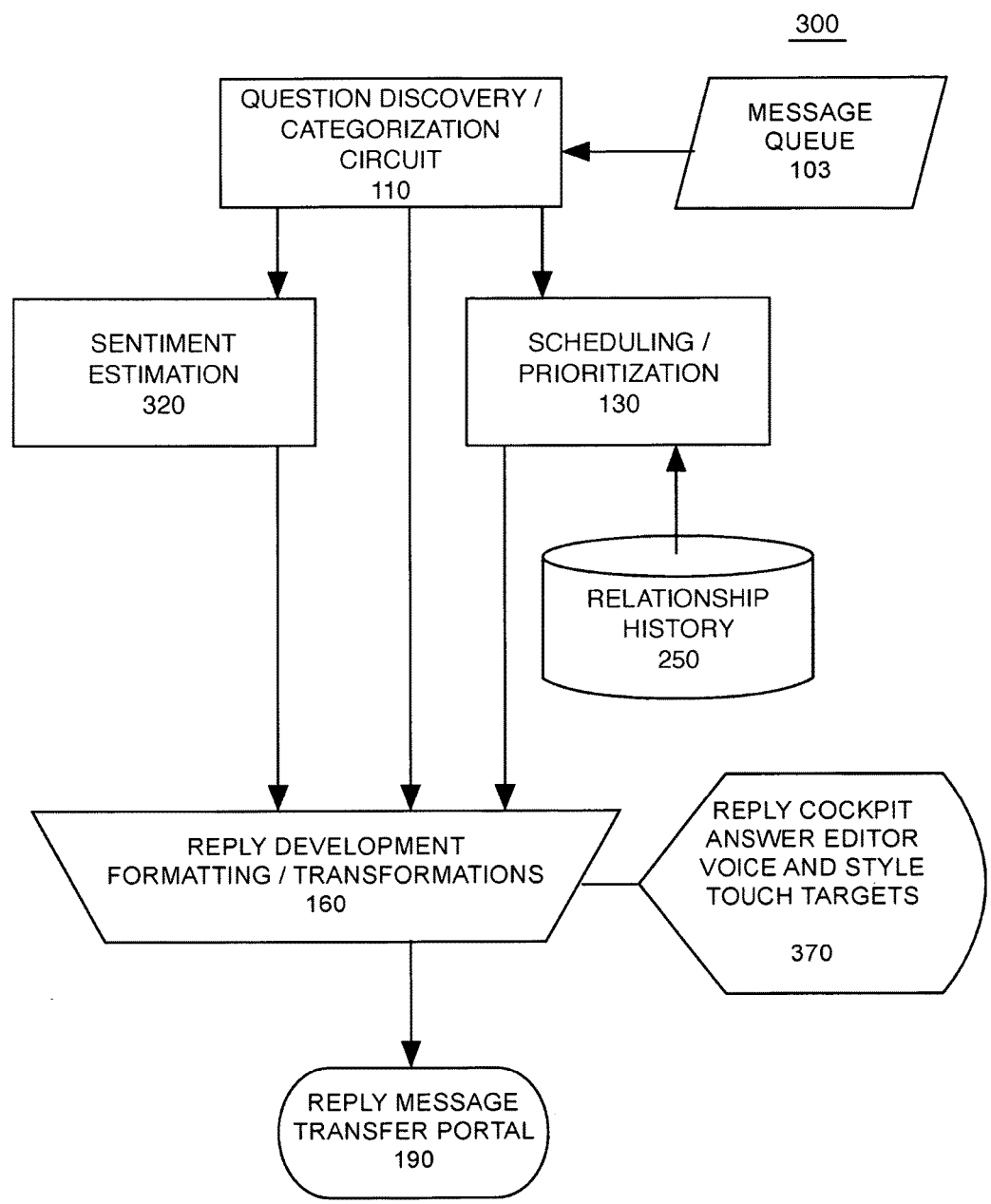

Referring now to FIG. 3, an improved system 300 also attaches a sentiment estimation circuit 320 to the question discovery circuit 110 in order to provide mood or urgency indicia to the reply development circuit 160. As the reply is being developed, the sentiment estimation circuit also provides feedback to the user.

The additional parsing of the message queue for sentiment vocabulary and syntax also influences the voice and style adopted by the user through the answer editor 370. In an embodiment, the answer editor is also coupled to the sentiment estimation circuit (not shown) to detect tone or attitude which is harsh, testy, or negative i.e. unsuitable for a customer or client facing role.

A recipient may by operating a user interface apparatus such as but not limited to speech synthesis and recognition, keyboard, biometric sensors, implants, pointing devices, and touch targets within the user interface of the reply cockpit deal with anxiety or anger by couching the answer in sympathetic or conciliatory tone or voice. The sentiment of the question may also accelerate the schedule or escalate the priority of preparing and transferring a reply. Sentiment may also trigger a more informal or immediate channel for the reply such as chat or video call through the reply cockpit initiated by a touch target. Scanning a reply during composition elicits published answers or alternate language for consistent positive helpfulness.

Figure 4:
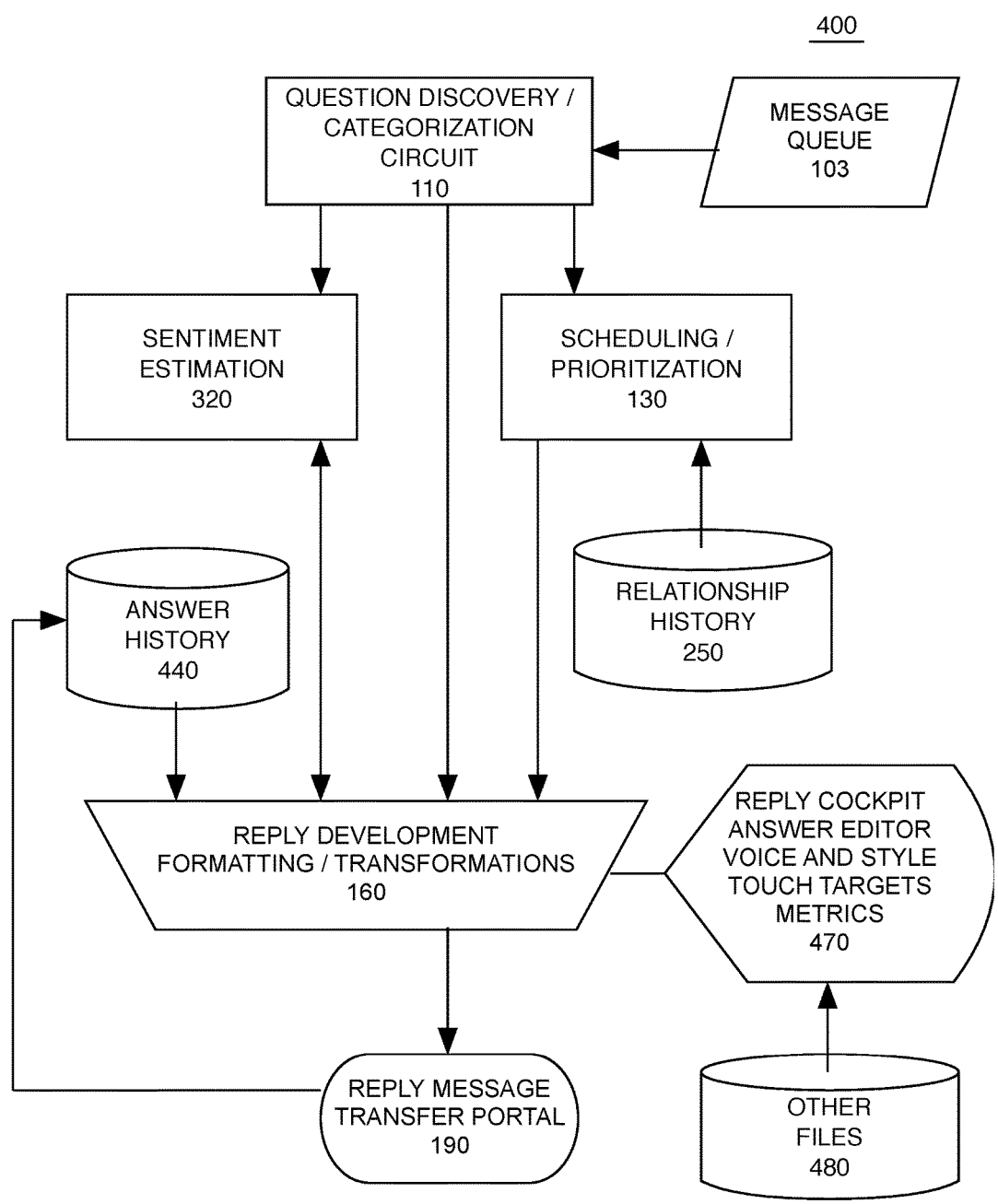

Referring now to FIG. 4, an improved system 400 also includes a store for answer history 440 to enable reuse of previously transferred reply content as well as frequently answered questions. The accessibility of team answer histories supports globally distributed customer support organizations. Similar answers are consolidated for consistency and clarity to eliminate ambiguity and misinterpretation.

Answer history includes Frequently Answered Questions or ad hoc answers previously provided and stored by recipient or recipient's functional teammates.

The system also has access to a store of other files 480 which may have content that is suitable to inclusion into a reply such as by dragging and dropping into the answer editor of the reply cockpit 470.

When the respondent determines that a video, image, or document is suitable for a reply, it may be dragged and dropped into a reply target area of a reply cockpit.

The user interface to the reply development circuit 470 may also display metrics of the current and target productivity or responsiveness of a team or an individual recipient.

A score of responses provided per period or compared to a target goal or rate can be displayed. A clock showing elapsed time or remaining time for responses may be displayed to the user.

Figure 5:
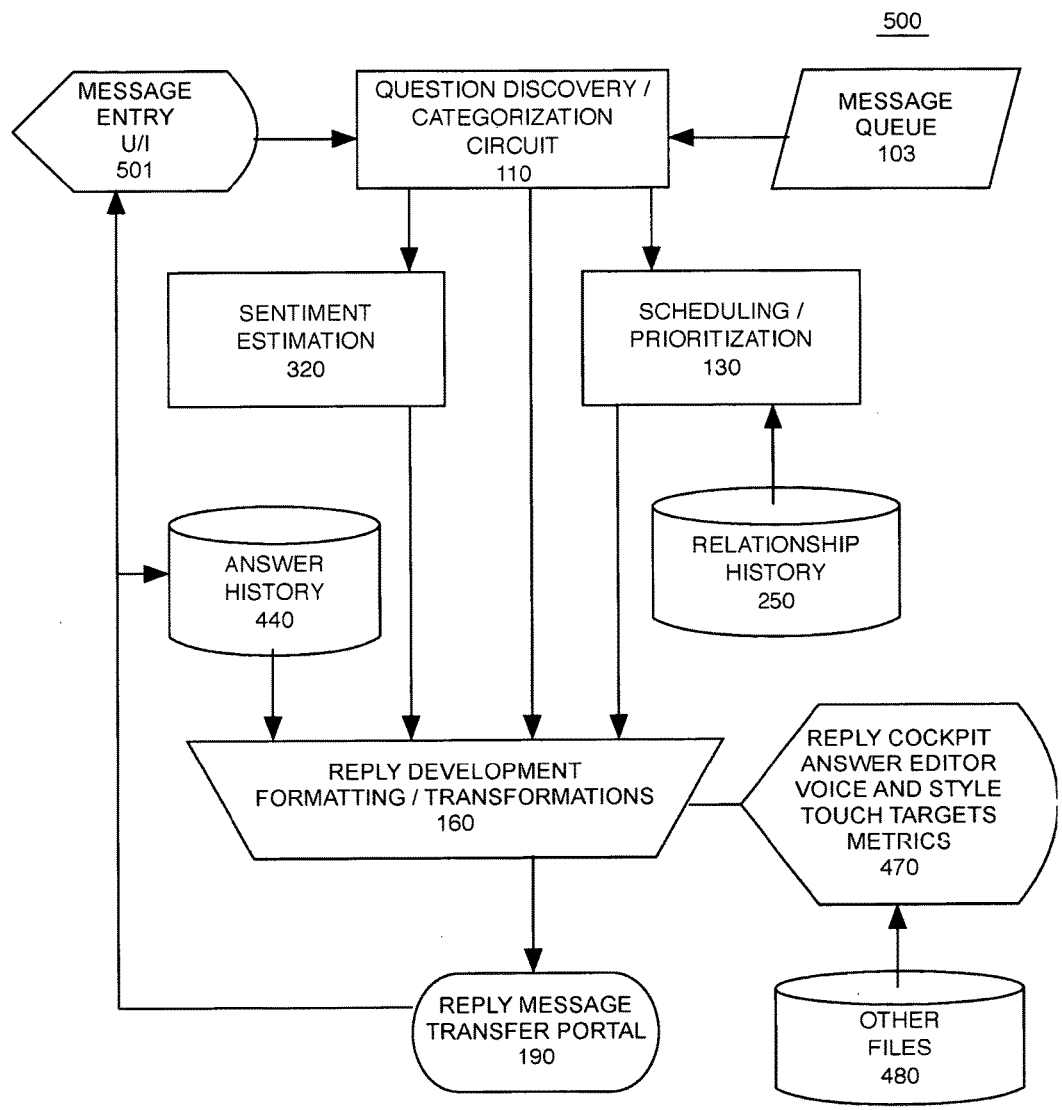

Referring now to FIG. 5, a tightly coupled system 500 also has access to a message entry user interface 501. In this integrated system, the question discovery circuit may scan a message during composition and inject into the user interface answers before a message is completed and added to a message queue. When a message entry has similarity to a frequently asked question, the apparatus offers to complete the query and if accepted, displays the associated answer immediately. This tightly coupled system unifies a messaging system with an archive of FAQs.

As is known, circuits disclosed above may be embodied by programmable logic, field programmable gate arrays, mask programmable gate arrays, standard cells, and computing devices limited by methods stored as instructions in non-transitory media.

Generally a computing devices 600 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A computing device may execute, operate or otherwise provide an application, which can be any type and/or form of software, program, or executable instructions, including, without limitation, any type and/or form of web browser, web-based client, client-server application, an ActiveX control, or a Java applet, or any other type and/or form of executable instructions capable of executing on a computing device.

Figure 6:
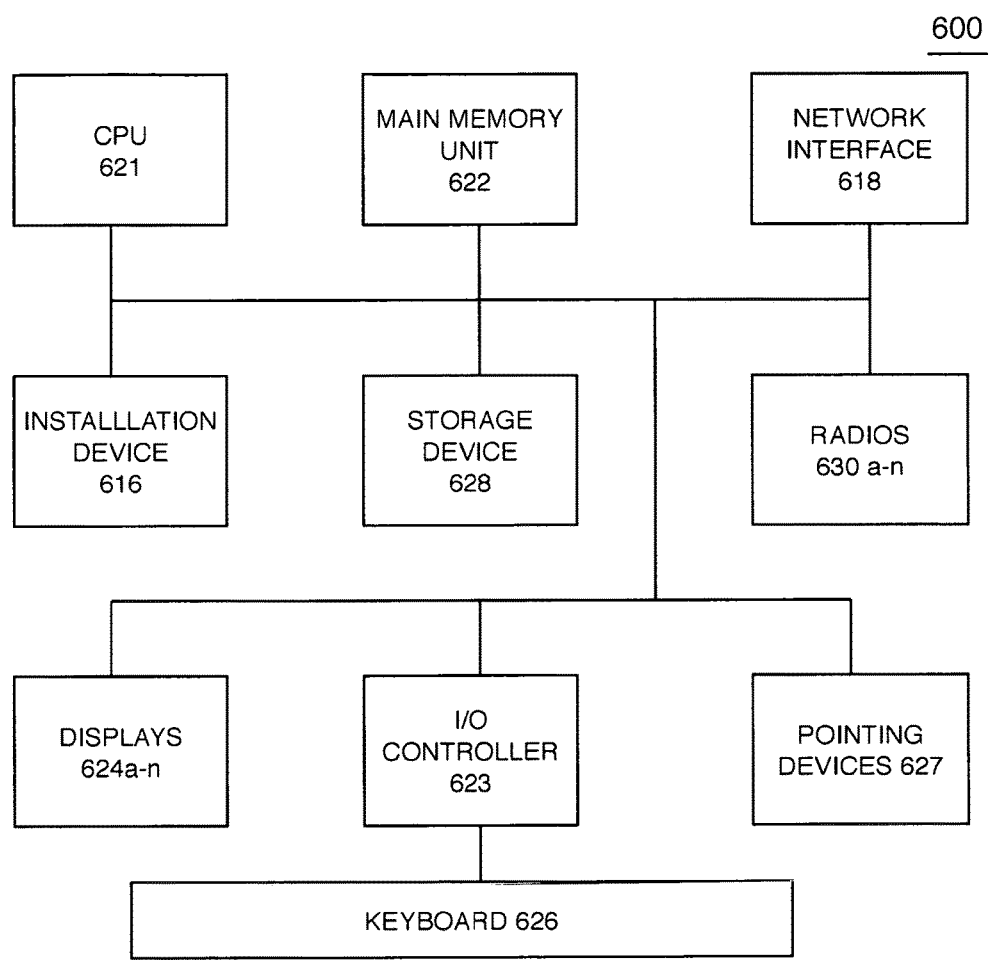
FIG. 6 is a block diagram of a processor suitable for performing a method embodiment of the invention.

FIG. 6 depicts a block diagram of a computing device 600 useful for practicing an embodiment of the invention. As shown in FIG. 6, each computing device 600 includes a central processing unit 621, and a main memory unit 622. A computing device 600 may include a storage device 628, an installation device 616, a network interface 618, an I/O controller 623, display devices 624*a-n*, a keyboard 626, a pointing device 627, such as a mouse or touchscreen, and one or more other I/O devices 630*a-n* such as baseband processors, Bluetooth, GPS, and Wi-Fi radios. The storage device 628 may include, without limitation, an operating system and software.

The central processing unit 621 is any logic circuitry that responds to and processes instructions fetched from the main memory unit 622. In many embodiments, the central processing unit 621 is provided by a microprocessor unit, such as: those manufactured under license from ARM; those manufactured under license from Qualcomm; those manufactured by Intel Corporation of Santa Clara, Calif.; those manufactured by International Business Machines of Armonk, N.Y.; or those manufactured by Advanced Micro Devices of Sunnyvale, Calif. The computing device 600 may be based on any of these processors, or any other processor capable of operating as described herein.

Main memory unit 622 may be one or more memory chips capable of storing data and allowing any storage location to be directly accessed by the microprocessor 621. The main memory 622 may be based on memory chips capable of operating as described herein.

Furthermore, the computing device 600 may include a network interface 618 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 600 communicates with other computing devices 600 via any type and/or form of gateway or tunneling protocol such as Secure Socket Layer (SSL) or Transport Layer Security (TLS). The network interface 618 may comprise a built-in network adapter, network interface card, PCMCIA network card, card bus network adapter, wireless network adapter, USB network adapter, modem or any other device suitable for interfacing the computing device 600 to any type of network capable of communication and performing the operations described herein.

A computing device 600 of the sort depicted in FIG. 6 typically operates under the control of operating systems, which control scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 10 and WINDOWS VISTA, manufactured by Microsoft Corporation of Redmond, Wash.; MAC OS and iOS, manufactured by Apple Inc., of Cupertino, Calif.; or any type and/or form of a Unix operating system.

In some embodiments, the computing device 600 may have different processors, operating systems, and input devices consistent with the device. In other embodiments the computing device 600 is a mobile device, such as a JAVA-enabled cellular telephone or personal digital assistant (PDA). The computing device 600 may be a mobile device such as those manufactured, by way of example and without limitation, Kyocera of Kyoto, japan; Samsung Electronics Co., Ltd., of Seoul, Korea; Nokia of Finland; Hewlett-Packard Development Company, L.P. and/or; Sony Ericsson Mobile Communications AB of Lund, Sweden; or Research In Motion Limited, of Waterloo, Ontario, Canada. In yet other embodiments, the computing device 600 is a smart phone, Pocket PC Phone, or other portable mobile device supporting Microsoft Windows Mobile Software.

Each computer program within the scope of the claims below may be implemented in any programming language, such as assembly language, machine language, a high-level procedural programming language, or an object-oriented programming language. The programming language may, for example, be PHP, PROLOG, PERL, C, C++, C#, JAVA, or any compiled or interpreted programming language.

Referring now to a flowchart of a method 700 of operation of a system such as disclosed in FIGS. 1-6.

Figure 7:
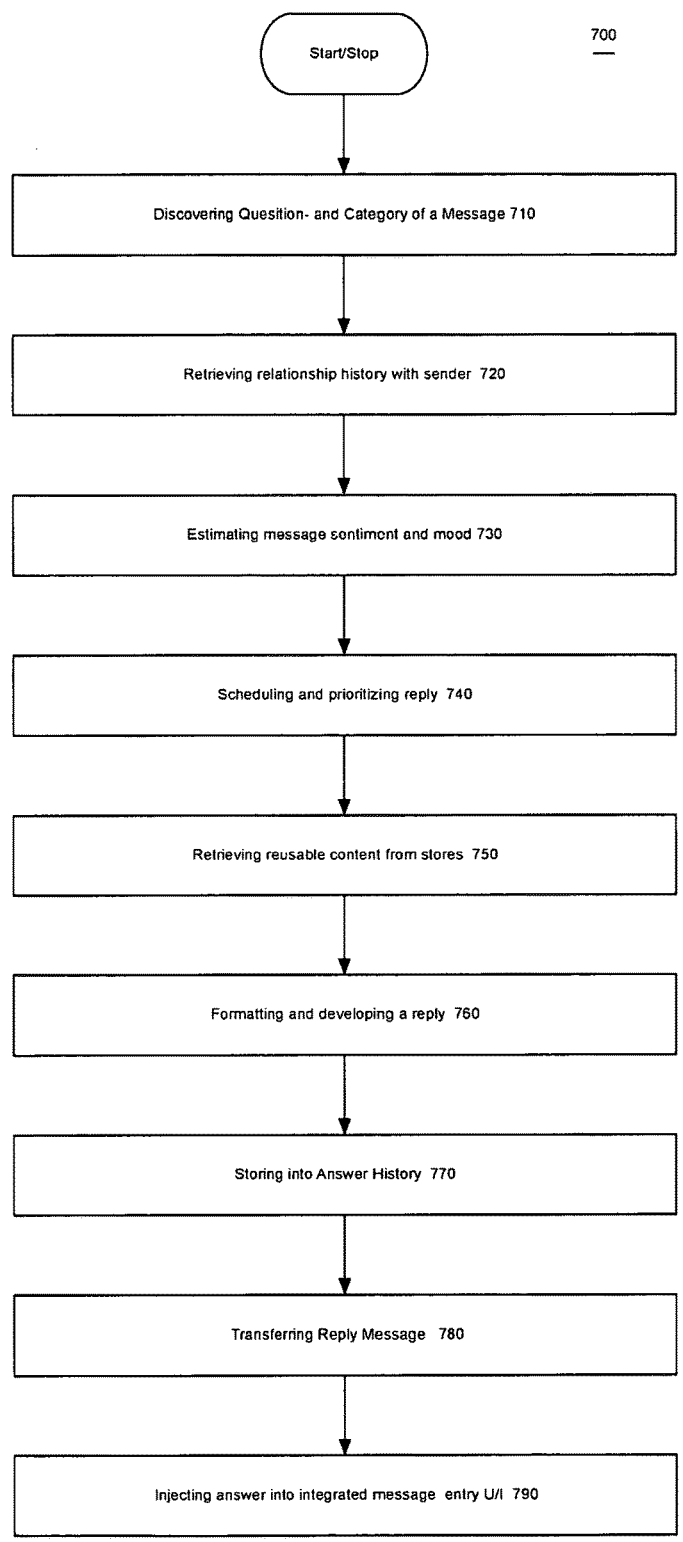
FIG. 7 is a flowchart of an exemplary method of operation.

FIG. 7 includes processes including: discovering a question and a category of a message 710; scheduling and prioritizing reply 740; formatting and developing a reply 760 by selecting or editing content; and transferring reply message to the sender 780.

The method further includes retrieving a relationship history 720 between sender and recipient, adjusting priority of a reply, and matching voice and style for continuity of the relationship.

The method further includes: estimating message sentiment and mood 730 for both incoming and reply messages; adjusting prioritization in part based on a relationship; presenting alternative voice and style reply language, and receiving a user selection of voice and style from a touch pad device.

The method further includes retrieving reusable content from stores 750 and storing a reply into answer history 770.

The method further includes accessing a message entry user interface to discover a question and injecting an answer into an integrated message entry user interface 790.

One aspect of the invention is a system for responding to electronic messages in various media which includes: a parsing subsystem to determine a question presented in a message and categorize the nature of desired response; a priority subsystem to determine urgency of the sender and sender's relative importance to recipient; a reply compositor subsystem to propose style, voice, formality, format of response according to medium and relationship; a grouping and scheduling subsystem to present a recipient with timely proposed replies in like formats; and a user interface apparatus including but not limited to speech synthesis and recognition, audio and video signal generation, optical tracking, gesture sensing, biometric measurements, and a touch-sensitive display to receive selections of content, style, delay, and transmission medium.

In an embodiment, the system has a presentation apparatus such as a video display, tactile actuator, or audio generation circuit of elapsed time spent on replying to messages and each message so far and a presentation apparatus such as a display, tactile actuator, or audio generation circuit of a count of messages replied to so far within a time range, or per session.

Another aspect of the invention is a message response apparatus which includes: at least one message reception circuit; a received message categorization circuit; a reply prioritization allocator circuit; a reply compositor circuit; and a user interface.

In an embodiment, the touch-sensitive user interface display Includes: means for selecting among alternative voice, sentiment, style, and formality; means for selection among alternative affirmations or negations, multiple choices, calendar dates, and preferences; means for entering text, numerical data, and icons; means for dragging and dropping files, images, and sounds; means for editing long essay replies and initiating applications; and means for rescheduling, cancelling, or transmitting reply messages in preferred medium.

As is known, circuits include gate arrays, programmable logic, and processors executing instructions stored in non-transitory media provide means for scheduling, cancelling, transmitting, editing, entering text and data, displaying and receiving selections among displayed indicia, and transforming stored files into audio streams, video streams, and images and receiving from a user interface e.g. speech recognition, keyboards, touchpads, touchscreens, pointing devices, and biometric sensors indications of acceptance, rejection, or selection.

In an embodiment, the reply compositor circuit includes: a circuit to search a stored of frequently answered questions; a circuit to search a store of previously transmitted replies; a circuit to transform interrogative language to declarations; a circuit to format a reply for affirmation or negation; a circuit to provide data entry fields; a circuit to transform a received message into a form with editable and non-editable sections; a circuit to determine suitable voice, tone, sentiment options; and a circuit to provide calendar options in a response. As is known, control over a display device and operating on user selections and input is not an abstract process and requires both input and output devices as well as transformations of stored information into transmitted replies and prioritization of which replies are presented according to interaction with the recipient.

In an embodiment, the reply prioritization allocator circuit includes: a circuit to determine when a received message contains one of a deadline and seeks a schedule date; a circuit to determine the complexity of reply sought; a circuit to determine relative importance of each message sender; a circuit to determining urgency or anxiety in the received message; a circuit to determine when a previously transmitted reply is appropriate; and a circuit to schedule replies relative to requested dates and deadlines. As can be appreciated, the previous history of the sender and recipient as well as the content of the immediate message influences a priority the apparatus places on composition and presentation of a synthesized reply and is not a retrieval of stored data.

In an embodiment, the received message categorization circuit includes: a circuit to determine when a message is a directive; a circuit to determine when a message contains a previously answered question; a circuit to determine when a message contains a deadline; a circuit to determine when a message asks for a binary decision or binary choice; a circuit to determine when a message requires a lengthy explanation or editorial; and a circuit to determine if the request can be fulfilled by dragging and dropping a file or a URL.

In an embodiment, the at least one message reception circuit includes: a circuit to determine a message sender, message body, and message meta-data; and a circuit to determine when a received message has a reference message identifier such as a header e.g. "in-reply-to".

In an embodiment, the message response apparatus also includes: a reply message transmission circuit; and a store for transmitted reply messages.

In an embodiment, the message response apparatus also includes: a circuit to identify prefatory and operative components of a received message; a circuit to reiterate the prefatory components of a received message to ensure understanding of needs and background; a circuit to transform the operative components of a received message into a declarative statement with selectable affirmation or negation; and a circuit to transform the declarative statement into a non-editable image.

In an embodiment, the message response apparatus also includes: a circuit to group similar reply formats for user intervention into one or more of the groups: affirmation/negation responses, one or more choices from an itemized list, calendar responses, short format names, proper names, locations, verbs, nouns, numerical measures or counts, drag and drop files, initiating text editors, and initiating non-text applications.

In an embodiment, the message response apparatus also includes: an instrumented message composition action application to determine interrogative forms; an application programming interface to discover a similar question in a frequently asked question knowledgebase; a circuit to scan previously stored transmitted replies to match a substantially similar query; and a user interface circuit to present related requests previously asked and answered.

Another aspect of the invention is a method for operation of a message response apparatus, the method including the processes: determining a category of query within a received electronic message; determining a priority of response to the sender of the message; and recording responses and responsiveness for future reuse and influence.

In an embodiment, the method also includes: retrieving stored content for reuse in a response to a query.

In an embodiment, the method also includes: transforming stored content, the query, and sentiment into portions of a draft reply.

In an embodiment, the method also includes: offering a user interface and template for recipient's selection and composition.

In an embodiment, said template includes alternative text, sound, and images providing vocabulary, tone, and familiarity suitable for at least one sender-recipient relationship type.

In an embodiment, transforming could be at least one of: converting an interrogative sentence into a declarative sentence; offering alternative multiple choices to the recipient for selection; reusing content from substantially similar responses; and determining style, tone, and vocabulary appropriate for the relationship between sender and recipient.

In an embodiment, stored content includes previously transmitted reply messages, components of documentation; frequently asked questions; and a knowledge base.

In an embodiment, determining a priority of response uses: matching queries and responses between sender and recipient; determining a metric of responsiveness; determining a deadline within a received message.

In an embodiment, determining a priority of response includes: alerting the recipient by presenting a response user interface; and receiving confirmation or amendments from user input.

It can be appreciated that a recipient's actions toward a sender influence the present and future priority and the invention captures both history and the recipient's immediate reaction to the message content. The invention controls both the presentation and scheduling of the proposed replies by hardware devices and receives user selections and new content for immediate and future use.

It should be understood that the systems described above may provide multiple ones of any or each of those components and these components may be provided on either a standalone machine or, in some embodiments, on multiple machines in a distributed system. The phrases in one embodiment', in another embodiment', and the like, generally mean the particular feature, structure, step, or characteristic following the phrase is included in at least one embodiment of the present disclosure and may be included in more than one embodiment of the present disclosure. However, such phrases do not necessarily refer to the same embodiment.

The systems and methods described above may be implemented as a method, apparatus or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output is provided to one or more output devices.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output.

CONCLUSION

The claimed invention is easily distinguished from simple filtering by regular expressions, sender addresses, or keywords. The invention is clearly distinguished by compositing a reply message according to the style and voice of the recipient suitable for the medium and the relationship with the sender and allocating priority according to the message content and category of request.

The invention is clearly distinguished by scheduling the reply according to the nature of the response sought and the effort required to furnish the response.

The invention is clearly distinguished by reuse of answers previously transmitted by recipient and recipient's peers in an organization. The invention is distinguished by searching published answers and previously transmitted answers during reply composition for reusable content and appropriate style for presentation to the operator.

Having described certain embodiments of methods and systems for distributing premises access credentials to authenticated recipients, it will now become apparent to one of skill in the art that other embodiments incorporating the concepts of the disclosure may be used. Therefore, the disclosure should not be limited to certain embodiments, but rather should be limited only by the spirit and scope of the following claims.

We claim:

1. A message response apparatus comprising the following communicatively coupled circuits and apparatus:
   at least one message reception circuit that obtains a message;
   a received message categorization circuit that detects a query component of the message received at the at least one message reception circuit, wherein the query component comprises one of a query, a directive, and a request;
   a reply prioritization allocator circuit that prioritizes the message among a plurality of messages in a message queue according to an estimation of a sender-recipient relationship between a sender of the message and a recipient of the message, wherein the estimation of the sender-recipient relationship is calculated based on historical messages between the sender and the recipient;
   a reply compositor circuit that:
      automatically constructs a proposed reply to the message by:
         (1) trimming a content of the message to include only a trimmed text of the query component of the message,
         (2) converting the trimmed text of the query component to a non-editable section,
         (3) interjects into the proposed reply a copy of the trimmed text of the query component of the message as a non-editable section of the proposed reply, and
         (4) providing a position for receiving input of a response immediately following the copy of the text of the query component of the message, wherein the position comprises an editable form field; and
   a user interface apparatus that presents the proposed reply.

2. The message response apparatus of claim 1 wherein the user interface apparatus comprises:
   means for presenting and selecting among alternative voice, sentiment, style, and formality;
   means for selection among alternative affirmations or negations, multiple choices, calendar dates, and preferences;
   means for entering text, numerical data, and icons;
   means for dragging and dropping files, images, and sounds;
   means for editing long essay replies and initiating applications;
   means for rescheduling, cancelling, or transmitting reply messages in preferred medium; and
   means for coordinating and exchanging indicia within the apparatus.

3. The message response apparatus of claim 1 wherein the reply compositor circuit comprises the following communicatively coupled circuits:
   a circuit to search a store of frequently answered questions;
   a circuit to search a store of previously transmitted replies;
   a circuit to transform interrogative language to declarations;
   a circuit to format a reply for affirmation or negation;
   a circuit to provide data entry fields;
   a circuit to transform a received message into a form with editable and non-editable sections;
   a circuit to determine suitable voice, tone, sentiment options; and
   a circuit to provide calendar options in a response.

4. The message response apparatus of claim 1 wherein the reply prioritization allocator circuit comprises:

a circuit to determine when a received message contains at least one of a deadline and a request for a schedule date;

a circuit to determine the complexity of reply sought;

a circuit to determine relative importance of each message sender;

a circuit to determining urgency or anxiety in the received message;

a circuit to determine when a previously transmitted reply is appropriate; and a circuit to schedule a reply relative to at least one of a requested date and a deadline.

5. The message response apparatus of claim 1 wherein the received message categorization circuit comprises:

a circuit to determine when a message comprises a directive;

a circuit to determine when a message contains a previously answered question;

a circuit to determine when a message contains a deadline;

a circuit to determine when a message asks for a binary decision or binary choice;

a circuit to determine when a message requires a lengthy explanation or editorial; and a circuit to determine if the request can be fulfilled by dragging and dropping a file or a URL.

6. The message response apparatus of claim 1 wherein the at least one message reception circuit comprises:

a circuit to determine a message sender, message body, and message meta-data; and a circuit to determine when a received message includes at least one reference message identifier.

7. The message response apparatus of claim 1 further comprising:

a reply message transmission circuit; and a store for transmitted reply messages.

8. The message response apparatus of claim 1 further comprising:

a circuit to identify prefatory and operative components of a received message;

a circuit to reiterate the prefatory components of a received message to ensure understanding of needs and background;

a circuit to transform the operative components of a received message into a declarative statement with selectable affirmation or negation; and a circuit to transform the declarative statement into a non-editable image.

9. The message response apparatus of claim 1 further comprising:

a circuit to group similar reply formats for user intervention into one or more of the groups:

affirmation/negation responses, one or more choices from an itemized list, calendar responses, short format names, proper names, locations, verbs, nouns, numerical measures or counts, drag and drop files, initiating text editors, and initiating non-text applications.

10. The message response apparatus of claim 1. further comprising:

an instrumented. message composition window to determine interrogative forms;

an application programming interface to discover a similar question in a frequently asked question knowledgebase;

a circuit to scan previously stored transmitted replies to match a substantially similar query; and a presentation circuit to present related requests previously asked and answered.

11. A system for responding to electronic messages in various media comprising:

a parsing subsystem, that detects a query component of an electronic message, wherein the query component comprises one of a query, a directive, and a request and categorize a nature of desired response from the message;

a priority subsystem that prioritizes the message among a plurality of messages in a message queue according to an estimation of a sender-recipient relationship between a sender of the message and a recipient of the message and an estimated urgency of the message, wherein the estimation of the sender-recipient relationship is calculated based on historical messages between the sender and the recipient;

a reply compositor subsystem that:

automatically constructs a proposed reply to the message by:

(1) trimming a content of the message to include only a trimmed text of the query component of the message, (2) converting the trimmed text of the query component to a non-editable section, (3) interjects into the proposed reply a copy of the trimmed text of the query component of the message as a non-editable section of the proposed reply, and (4) providing a position for receiving input of a response immediately following the copy of the text of the query component of the message, wherein the position comprises an editable form field;

a grouping and scheduling subsystem to present a recipient with timely proposed replies in like formats;

a user interface apparatus to receive selections of content, style, delay, and transmission medium and that presents the proposed reply; and a communication network coupling at least the above subsystems and circuits.

12. The system of claim 11 further comprises:

a presentation apparatus of elapsed time spent on replying to messages and each message so far; and a presentation apparatus of a count of messages replied to so far within a time range, or per session.

* * * * *